United States Patent [19]

Sprehe et al.

[11] Patent Number: 5,659,997
[45] Date of Patent: Aug. 26, 1997

[54] BAG FOR THE CULTIVATION OF MUSHROOM SPAWN

[75] Inventors: Gregory S. Sprehe, Carbondale; Lester Siebert, Cobden; William Towne, Carbondale, all of Ill.

[73] Assignee: Compac International, Inc., Carbondale, Ill.

[21] Appl. No.: 425,136

[22] Filed: Apr. 19, 1995

Related U.S. Application Data

[63] Continuation of Ser. No. 128,886, Sep. 29, 1993, abandoned.
[51] Int. Cl.⁶ ..................................................... A01G 1/04
[52] U.S. Cl. ........................................................... 47/1.1
[58] Field of Search ................................. 206/439, 423, 206/484.1; 383/102; 47/1.1

[56] References Cited

U.S. PATENT DOCUMENTS

| | | | |
|---|---|---|---|
| 436,287 | 9/1890 | Marshall | 229/88 |
| 2,739,755 | 3/1956 | Ottinger | 229/54 |
| 3,291,374 | 12/1966 | Lepisto et al. | 229/55 |
| 3,999,949 | 12/1976 | Andersson et al. | 428/138 X |
| 4,063,383 | 12/1977 | Green | 47/1.1 |
| 4,311,477 | 1/1982 | Kitamura et al. | 493/195 |
| 4,878,312 | 11/1989 | Shimizu | 47/1.1 |
| 4,882,893 | 11/1989 | Spencer et al. | 53/449 |
| 4,956,209 | 9/1990 | Isaka et al. | 428/35.2 |
| 4,977,702 | 12/1990 | Fortin et al. | 47/1.1 |
| 5,150,787 | 9/1992 | Bird et al. | 428/138 X |

FOREIGN PATENT DOCUMENTS

| | | |
|---|---|---|
| 148-436 | 12/1979 | German Dem. Rep. . |
| 3734-509A | 4/1989 | Germany . |
| 0085 928 | 8/1983 | Italy . |
| 0004673 | 1/1990 | Japan . |
| 2286-012 | 11/1990 | Japan . |
| 647-209A | 1/1985 | Switzerland . |
| 1176188 | 1/1970 | United Kingdom ............. A01G 1/04 |

*Primary Examiner*—James R. Feyrer
*Attorney, Agent, or Firm*—Michael, Best & Friedrich

[57] ABSTRACT

An improved bag for the cultivation of mushroom spawn is provided the bag has continuous gas permeable sealing strips sealed to the inside walls of the bags which covering openings in the bag, so as to allow the bag to be vented without loss of moisture. The openings and sealing strips are positioned close to the top and bottom of the bag so as to maximize air flow through the mushroom spawn without creating dry spots, thereby improving spawn yield.

19 Claims, 1 Drawing Sheet

U.S. Patent  Aug. 26, 1997  5,659,997
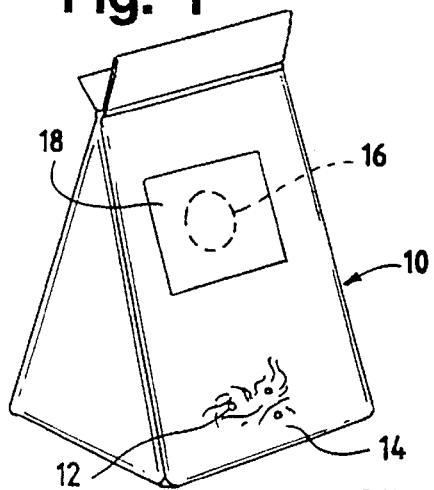
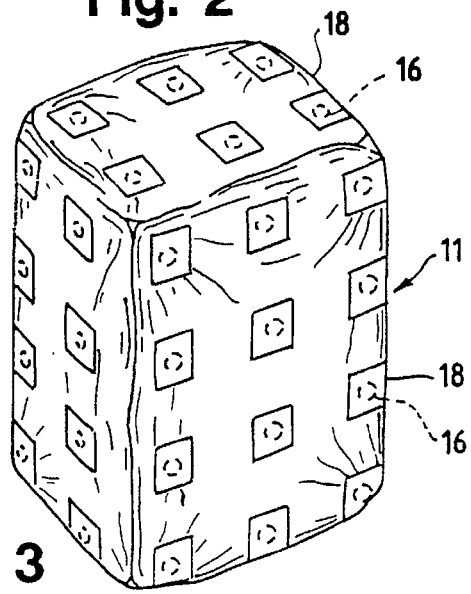
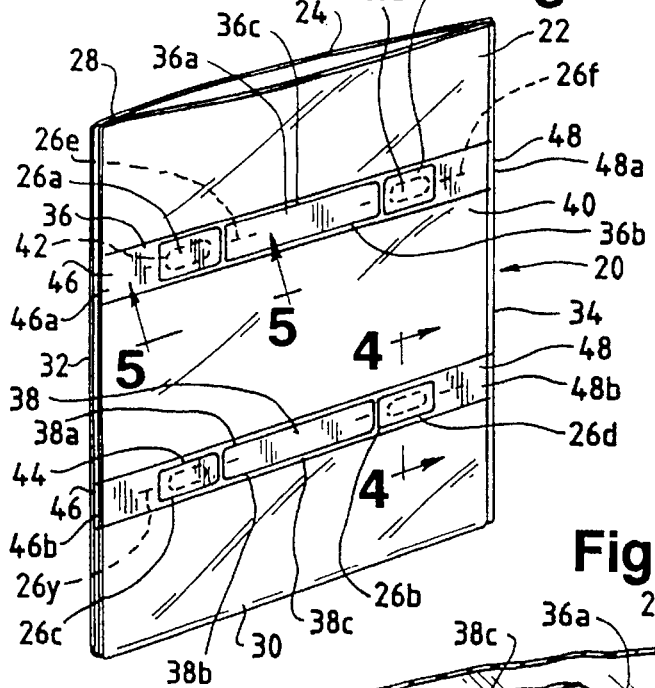
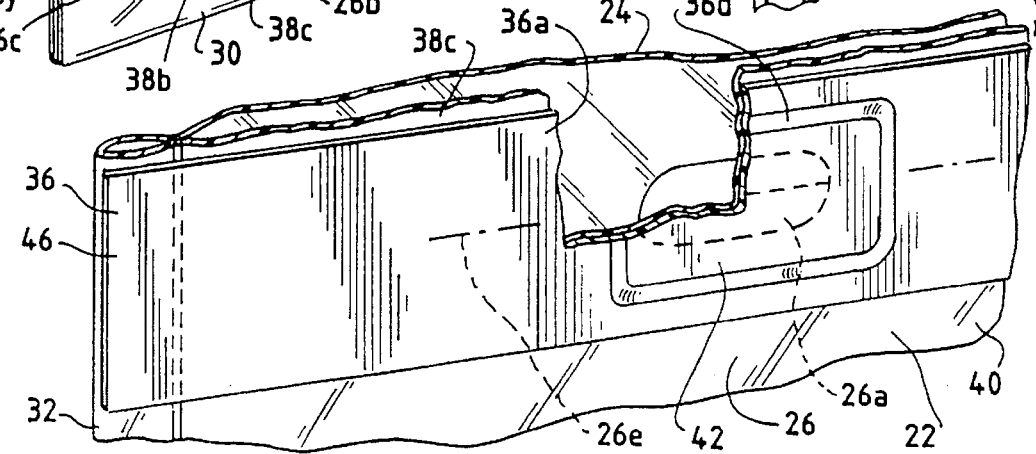

BAG FOR THE CULTIVATION OF MUSHROOM SPAWN

This is a continuation of application Ser. No 08/128,886, filed Sep. 29, 1993, entitled "IMPROVED BAG FOR THE CULTIVATION OF MUSHROOM SPAWN", now abandoned.

BACKGROUND OF THE INVENTION

The present invention relates generally to plastic bags and more particularly to a novel air permeable bag suitable for use in the cultivation of mushroom spawn.

It has been customary in the past to produce mushrooms in plastic bags. This is accomplished by pasturizing a substrate, inoculating the substrate with mushroom spawn seeds, transferring the mixture into plastic bags and after a suitable method of incubation, collecting the mushrooms at maturity. The inoculation is performed by mixing the substrate and the fungus seeds in the open air. This operation also requires for the pasturization room to remain open for several hours. Moreover, since it is highly desirable to prevent contamination of the mushroom from contact with microbes in the air, the transfer of inoculated, pasturized substrate from one container to plastic bags involves some difficulty.

U.S. Pat. No. 2,851,821 discloses mushroom spawn grown in a plastic bag. The bag is closed by turning the ends of the bag and forming a chimney, and it is sealed by placing a wad of cotton or the like in the chimney thus formed. In another embodiment, a tube is inserted in the top of the bag and the bag gathered around the tube of the string. A filter plug is then placed in the tube.

Another method is described in U.S. Pat. No. 4,027,427 wherein the spawn is grown in a plastic bag provided with a temporary filter cover. This bag is provided with a removal closure mechanism for filling the bag and maintaining sterility during the processing steps.

U.S. Pat. No. 4,977,702 discloses a bag for the production of eatable mushrooms which is provided with a number of gas exchange surfaces or membranes which are impervious to outside microorganizms, thereby avoiding contamination of the nutrient substrate by outside microorganisms. Innoculation can be performed by injection of the inoculum in suspension through the plastic bag. The gas exchange membranes of the bag may be made of Dupont Tyvek® spun bonded polyolefin. U.S. Pat. No. 4,311,477 teaches a bag for cultivating mushrooms constructed, at least in part, from a micro-porous film having gas permeability, but which does not pass bacteria and infectious microbes.

Although it has been found that the above-listed bags are suitable for the production of mushroom spawn, it has also been found that the growth of the spawn is hindered within the bags by the lack of adequate airflow and direction of the airflow at an appropriate volume to the substrate within the bags.

Accordingly, it is an object of the present invention to provide an improved plastic bag for the growth of mushroom spawn which is low in cost, easy to produce and which circulates uncontamininated air to the substrate within the bag in an improved manner, thereby resulting in improved mushroom production rates and quantities.

The following U.S. and foreign references were identified as being relevant to the present invention:

U.S. Pat. Nos. 4,878,312 CHIMICU, 4,977,702 FORTIN ET AL; EP No. 83-742416; JAPAN 2286-012; JAPAN 2-4673; GERMANY 3734-509-A; SWITZERLAND 647-209-A; GREAT BRITAIN 1,176,188 and GERMANY 148-436.

SUMMARY OF THE INVENTION

An improved plastic bag for the cultivation of mushroom spawn is disclosed. The bag has front and back walls having a plurality of openings disposed therethrough, a closed bottom, a sealable top and sealed left and right sides. The improvement of the present bag over the prior art comprises the construction and arrangement of the gas permeable windows of the bag. In the present invention, a pair of gas permeable sealing strips are sealed to the outside walls of the bag which cover openings through the bag walls. The openings are arrayed in a pair of parallel rows near the top and bottom of the bag. As a result of the positioning of the rows, the size of the openings and the number of openings, an optimum air flow through the bag is created. At the same time, the passage of moisture out of the bag is prevented, so as to reduce dry spots in the mushroom spawn, thereby improving spawn yield. In addition, the use of strips of gas permeable material rather than individual patches greatly facilitates the manufacture of the bas and reduces the cost thereof.

In a preferred embodiment, the openings through the bag walls are of substantially equal size, in a lateral array through the front wall of the bag, and spaced inwardly from the left and right sides. The openings are preferably oval in shape which facilitates cutting of the openings from the plastic used to manufacture the bag and also facilitates removal of the plastic from the oval openings after cutting. The openings are preferably ½" wide by 1½" long and the sealing strips are approximately 1" to 1½" wide and at least 2" long to insure complete sealing of the opening by the sealing strip, although again other sizes may be used. In a preferred embodiment, the sealing strip comprises spun bonded microporous polyolefin; i.e. DuPont Tyvek® type material. The sealing strips are sealed to the bag wall, preferably, in a rectangular sealing grid which extends entirely around the opening of the bag wall.

The aforesaid openings are preferably arrayed through the front wall of the bag in an upper row having a centerline approximately 6½" from the top of the bag and the gas permeable film strip is spaced approximately 5½", (centerline), from the top of the bag. The lower row of openings is preferably spaced with a centerline approximately 5" plus or minus a half-inch from the bottom of the bag and one of the gas permeable film strips is spaced approximately 4½" (centerline) plus or minus a half inch from the bottom of the bag.

BRIEF DESCRIPTION OF THE DRAWINGS

FIG. 1 of the drawings is a front perspective view of a prior art bag.

FIG. 2 of the drawings is a front perspective view of an additional prior art bag for the growth of mushroom spawn.

FIG. 3 of the drawings is a front perspective view of the improved mushroom spawn bag of the present invention.

FIG. 4 of the drawings is a cross sectional view taken along line 4—4 in FIG. 3.

FIG. 5 of the drawings is an enlarged view, partially broken away for purposes of illustration, of the improved mushroom spawn bag shown along line 5—5 id FIG. 3.

DETAILED DESCRIPTION OF THE PREFERRED EMBODIMENT

While the present invention is susceptible of embodiment in many different forms, there is shown in the drawings and will herein be described in detail several specific embodiments with the understanding that the invention is not limited thereto except insofar as those who have the disclosure before them are able to make modifications and variations without departing from the scope of the invention.

As shown in FIGS. 1 and 2, it is known to use a polyethylene plastic bag 10 or 11 for the growth of mushroom spawn 12. Mushroom spawn 12 in turn is injected into nutrient substrate 14 contained within bag 10 for the growth of mushrooms 12. Plastic bag 10 is characterized by its opacity and its water resistance, and is provided with perforations 16 which in the case of U.S. Pat. No. 4,977,702 are 0.3 centimeters in diameter and 0.10 centimeters apart. These perforations 16 are covered by a gas exchange membrane 18 which is hermetically sealed around and covers each individual perforation 16. Gas exchange membrane 18 is permeable to air and impermeable to-particles, like dust, powder and micro organisms. For example, bag 10 or 11 can be made of polyethylene which is sold by First Brands Industries Corporation under the trademark Glad® Bags. The gas exchange membranes 18 for example, are made of porous material which is sold by DuPont Company, Wilmington, Del., U.S.A. under the name Tyvek®. More specifically, the Tyvek used is the type 10, style 1059B characterized by its opacity of 85 Eddy, its porosity of 11 to 31 seconds100 cc/square inch, its water resistance through the hydrostatic pressure test of 47 to 73 inches and having no anti-static agents or aerosol sprays. The nutrient substrate 14 is packaged into the plastic bag 10 to form mushroom molds of 10 to 30 kilograms. The substrate 14, (preferably straw) is preferably cut into pieces of 5 centimeters, soaked for 12 hours and finally drained.

In use the substrate 14 is first pasturized, then, secondly, cooled during the night. The substrate 14 has its temperatures raised to between 70° and 80° F. through water vapor. Again, the substrate is allowed to cool down during the following night. The most important aspect of the perferred thermal treatment resides in a two temperature peaks imposed on the substrate in two different phases.

The third step of the prior art method of growing mushroom spawns 12, comprises inoculating the pasturized nutrient substrate 14 with a suspension of the desired mushrooms produced in liquid fermentation. The inoculum is prepared for example, using a fermenting device of type Vertus® or type Belco® with a liquid medium. Under required conditions of constant agitation and separation of the liquid medium, the inoculum is recovered after 4 days of incubation at 25° centrigrade. Preferably, the conditions of incubation are characterized by a constant agitation of the substrate and a renewed air supply. An inoculum density of approximately 8 grams of dry weight mycelium per liter of medium is obtained through the use of this method. Because the inoculum is in suspension, it renders the inoculation of the pasturized substrate through the walls of the plastic bag possible. The inoculation is preferably made at the rate of 1 liter of inoculum per 20 kilograms of substrate, five milliliters per shot. The fourth step of the process comprises incubating the inoculated pasturized nutrient medium. Once the inoculation is complete, the plastic bags are placed vertically in an incubation room. The most desired incubation conditions will be a temperature of 24° centigrade, a humidity factor of 90%, total darkness and no renewed air supply. The spawn running requires 15 to 21 days.

Thereafter, the gas exchange surface membranes 18 are removed and the temperature is raised 2° centigrade permitting the development of the fruit bodies from the appeared primordia through the perforations. A great number of fruit bodies having the normal shape and color inherent in pleurotus or volvaria are formed. The sixth and last step of prior art mushroom spawn growth comprises collecting the edible mushrooms at maturity from the first flush and then every 7 to 10 days for several weeks.

As shown in FIG. 3 of the drawings, in the present invention, an improved bag 20 for the cultivation of mushroom spawn 12 is disclosed. Bag 20 has a front wall 22, a back wall 24 and a plurality of openings 26 disposed through the front wall 22. Bag 20 further has a top 28, a closed bottom 30, a sealed left side 32 and a sealed right side 34. One of the principal improvements of the present invention over the prior art is the use of a pair of gas permeable sealing strips 36 and 38 sealed to the outside surface 40 of the front wall 22 over openings 26.

Preferably, the openings 26 will comprise a pair of parallel rows 42 and 44, respectively, near the top 28 and the bottom 30 of bag 20. In the preferred embodiment shown, a pair of openings 26a and 26b are located proximate the top 28 of bag 20. An additional pair of openings 26c and 26d are located proximate bottom 30 of bag 20. This arrangement provides more uniform breathability of the mushroom spawn 12 through the gas permeable sealing strips 36 and 38. In addition, it reduces loss of moisture from within bag 20, thereby reducing dry spots in the mushroom spawn 12, and thus, improving spawn yields.

As further seen in FIG. 3, the pairs of openings 26a, 26b, 26c and 26d are of substantial equal size and are laterally arrayed through the front wall 22 of the bag 20 inwardly of the left side 32 and right side 34 respectively of bag 20. Row 42 is the upper row and row 44 is the lower row. Openings 26, in the embodiment shown, are substantially oval in shape in order to facilitate cutting of bag 20 during manufacture, and to facilitate removal of the resulting oval cut out from the openings 26. In the preferred embodiment, openings 26 are approximately ½" wide by 1½" long so as to insure adequate air flow through the openings 26, but prevent excessive loss of moisture from the bag. Sealing strips 36 and 38 are approximately 1" to 1½" wide and at least 2" long so as to insure complete sealing of openings 26a, 26b, 26c and 26d of the sealing strips. In the preferred embodiment, sealing strips 36 and 38 each comprise a continuous strip of gas permeable film sealed horizontally above and below openings 26 from the left side 32 to the right side 34 of bag 20 and sealed vertically on the left side 46 and the right side 48 of each of said openings 26. In the embodiment shown, these seals comprise left side seals 46a, 46b, 46c and 46d and right side seals 48a, 48b, 48c and 48d, top seals 36a and 38a and bottom seals 36b and 38b. The sealing of continuous strips 36 and 38 covers the openings 26 and thereby substantially restricts passage of moisture therethrough while allowing the flow of air.

In the preferred embodiment, the sealing strips 36 and 38 are constructed of spun bonded micro porous polyolefin; i.e. Tyvek®. Tyvek type 10 style is preferred. One type of Tyvek type 10 is 1059b, is previously known in the prior art as described above. Two other types that may be used are style 1056d and 1073b. The physical characteristics of the three types of type 10 Tyvek are disclosed in the chart shown on page 12.

Additionally, the water vapor transmission rate of the three types of type 10 Tyvek are 694 grams/m$^2$/24 hours for type 1056D; 684 g/m$^2$/24 hours for type 1059B and 614 g/m$^2$/24 hours for type 1073D. Type 1073B has a water vapor transmission rate of 641 grams per/m$^2$/24 hours. It has been found that these styles of Tyvek type 10 are suitable for use in the manufacture of gas permeable sealing strips 36 and that in use they substantially restricts passage of moisture through openings 26 but allow ready passage of air.

In the preferred embodiment, the upper row 42 of openings 26 have centerlines 26e and 26f, spaced approximately 6" plus or minus ½ inch from the top 28 of bag 20. Gas permeable sealing strip 36 has a top edge 36a spaced approximately 5½" from the top 28 of bag 20. The lower row 44 of openings 26 are spaced approximately 5" plus or minus ½" from the bottom 30 of bag 20 to their centerlines 26f and 26h and gas permeable strip 38 is spaced approximately 4½" plus or minus ½" from the bottom 30 of bag 20 to its centerline 38c.

In the preferred embodiment, bag 20 is constructed of polyethylene having a thickness of 2 mils to 10 mils. Sealing strips 36 and 38 preferably have a thickness of 5 mils to 10 mils and a porosity of 138 cubic feet per minute according to the Frazer test, ASTM D737.

It has been found through the use of bags such as bag 20, that the quantity of mushroom grown using identical spawning techniques is increased from 15% to 33% without an increase in cost. Accordingly, a strong demand for this product is anticipated.

| | STYLE 1025D Average Range[1] | STYLE 1059B Average Range[1] | STYLE 1073B Average Range[1] | STYLE 1073D Average Range[1] |
|---|---|---|---|---|
| Basis weight, oz./sq. yd. | 1.60 1.50–1.70 | 1.80 1.70–1.90 | 2.20 2.07–2.33 | 2.20 2.07–2.33 |
| Thickness, mils | 6.0 3.0–9.0 | 6.4 3.4–9.4 | 7.5 4.5–10.5 | 7.6 4.6–10.6 |
| Strip tensile (MD[2]), lbs./in. | 26 21–31 | 35 27–43 | 41 36–52 | 42 34–50 |
| Strip tensile (XD[2]), lbs./in. | 29 21–37 | 38 30–46 | 50 40–60 | 48 38–58 |
| Elongation at break (MD), % | 17 12–22 | 21 16–26 | 23 18–28 | 22 17–27 |
| Elongation at break (XD), % | 23 18–28 | 27 22–32 | 29 24–34 | 28 23–33 |
| Tear Elmendorf (MD), lbs. | 1.0 0.5–1.5 | 0.8 1.5–1.1 | 0.9 0.6–1.2 | 1.0 0.7–1.3 |
| Tear Elmendorf (XD), lbs. | 1.0 0.5–1.5 | 0.8 0.5–1.1 | 0.9 0.6–1.2 | 1.0 0.7–1.3 |
| Opacity, Eddy, %[3] | 89 84–94 | 85 80–90 | 87 82–92 | 89 84–94 |
| Porosity, Gurley, sec./ 100 cc/sq. in. | — | 21 11–31 | 21 11–31 | — |
| Internal bond, lb./in. | 0.34 0.24–0.44 | 0.47 0.37–0.57 | 0.47 0.34–0.60 | 0.43 0.30–0.56 |
| Water resistance hydrostatic pressure test, in. | — | 60 47–73 | 63 53–73 | — |
| Electrical surface resistivity, log R | 7.8 7.0–8.6 | — | — | 8.0 7.2–8.8 |
| Treatment | Corona/ Antistat both sides | No Corona No Antistat | No Corona/ No Antistat | Corona/ Antistat both sides |

[1]Ranges are estimates only for 95% of the product based upon roll average standard deviations except thickness ranges which are based on individual specimens.
[2]MD is Machine Direction, XD is Cross Direction
[3]100% is opaque
[4]1 sq. yd.
[5]7.15 psi pressure, 0.62 in. dia. pressure foot
[6]Cut Strip; CRE tensile tester, crosshead speed 2 in./min., gauge length 5 in.
[7]CRE tensile tester, crosshead speed modified 5 in./min., distance 2.5 in. peel
[8]Converted to log R

We claim as our invention:

1. An improved bag for the production of mushroom spawn, said bag comprising:

front and back walls having a plurality of openings disposed therethrough, said openings being arrayed in a pair of parallel rows proximate, respectively, said top and bottom of said bag; said bag having a top and a bottom, and left and right side panels;

a plurality of continuous gas permeable sealing strips sealed to said walls and covering each of said openings, said sealing strips respectively covering said rows, each sealing strip having a length sufficient to cover all of the openings in the row that it covers and a width less than the distance between said top and bottom of said bag, said openings and said gas permeable sealing strips being attached over a plurality of said openings so as to enhance moisture retention within said bag and thereby reduce dry spots in said mushroom spawn and improve spawn yield; and, said continuous gas permeable sealing strips being of an adhered slowly moisture permeable material to contribute to manufacturing ease of said bag and a reduction in the mount of labor associated with the production of said bag.

2. The improved bag of claim 1, wherein each of said rows comprises a pair of said openings, said openings being of substantially equal size, laterally arrayed through said front wall of said bag and inwardly of said left and right sides, said rows further comprising an upper row and a lower row, said upper row being spaced downwardly from said top of said bag and parallel thereto and said lower row being spaced upwardly from said bag and parallel thereto and said lower rom being spaced upwardly from said bottom of said bag and parallel thereto whereby air is permitted to circulate more freely through said bag.

3. The improved bag of claim 1 wherein each of said openings is substantially oval in shape so as to facilitate removal of material from the oval openings after cutting.

4. The improved bag of claim 1 wherein each of said openings is approximately one half inch wide by one and one half inches long so as to insure adequate air flow though said openings.

5. The improved bag of claim 1 wherein each of said sealing strips is approximately one to one and one half inches wide and at least approximately two inches long so as to insure complete sealing of said opening by said sealing strip.

6. The improved bag of claim 1 wherein each of said sealing strips comprises a continuous strip of gas permeable film sealed horizontally above and below said openings from said left side of said bag to said right side of said bag, and sealed vertically proximate the left side and the right side of each of said openings, said continuous strips being sufficiently large to cover and seal said openings and forming a substantially interconnected, continuous seal connecting said sealing strip to said wall so as to restrict passage of moisture therethrough.

7. The improved bag of claim 1 wherein said sealing strips comprise spunbonded microporous polyolefin.

8. The improved bag of claim 1 wherein said bag comprises polyethylene having a thickness of 2 mils to 10 mils.

9. The improved bag of claim 1 wherein said sealing strip has a thickness of five to ten mils and is constructed of spunbonded microporous polyolefin.

10. The improved bag of claim 1 wherein said continuous sealing strip has a water vapor transmission rate of 600–700 grams/meter$^2$/24 hours.

11. A bag for the production of mushroom spawn, said bag comprising:

front wall having a plurality of substantially aligned openings disposed therethrough, a top and a bottom, and left and right sides; and a continuous strip of gas permeable film sealed horizontally above and below said openings from said left side of said bag to said right side of said bag to thereby form a continuous seal extending across the top, bottom and each side of said openings, and sealed vertically on said left and right sides of said bag and on each of said openings, said continuous strip of sufficient size and attached to cover and seal said openings, said openings and said continuous strip of gas permeable film of a sufficient size on said closed front wall to enhance moisture retention within the bag and thereby reduce dry spots in said mushroom spawn and improve spawn yield; and, said continuous strip of gas permeable film being unitary, integral and of substantially uniform size to contribute to manufacturing ease of said bag and a reduction in the amount of labor associated with the production thereof.

12. The bag of claim 11 wherein a pair of said continuous strips of gas permeable fill seals are provided, each of said strips covering a pair of openings, said openings being arrayed in a pair of parallel rows proximate, respectively, said top and bottom of said bag so as to provide more uniform air circulation for said mushroom spawn within said bag.

13. The bag of claim 12 wherein said pair of said openings are of substantially equal size, laterally arrayed through said front wall of said bag inwardly of said left and right sides, said openings further comprising an upper row, and a lower row spaced apart from said upper row, said upper row being parallel to said top of said bag and said lower row being parallel to said bottom of said bag whereby air is permitted to circulate more freely through said bag.

14. The bag of claim 13 wherein said upper row of openings is spaced approximately six inches from said top of said bag and one of said strips has a top edge spaced approximately five and one half inches from said top of said bag.

15. The bag of claim 13 wherein said lower row of said openings is spaced approximately five inches plus or minus one half inch from said bottom of said bag and one of said gas permeable film strips is spaced approximately four and one half inches plus or minus one half inch from said bottom of said bag.

16. The bag of claim 11 wherein each of said openings is substantially oval in shape so as to facilitate removal of the plastic from the oval openings after cutting.

17. The bag of claim 11 wherein each of said openings is approximately one half inch wide by one and one half inches long so as to insure adequate air flow through said openings.

18. The bag of claim 11 wherein each of said gas permeable film strips is approximately one to one and one half inches wide and at least approximately two inches long so as to insure complete sealing of said opening by said film strips.

19. A bag for the production of mushroom spawn, said bag comprising:

a front wall, and a closed back wall, said bag having a sealably closable top, a flat, closed bottom, a flat, closed left side, and a flat, closed right side, said bag having an inside surface and an outside surface;

exactly two parallel, spaced apart rows of apertures through only said front wall of said bag, each of said apertures being in the general shape of an oval having a major axis in the direction between said left and right sides; and, a pair of parallel, spaced apart, strips including gas permeable sealing material, said strips respectively covering said rows of apertures and being attached to the outside surface of said front wall of said bag with gas permeable sealing material covering each of said oval apertures, each said strip extending in the direction between said left and right sides, said apertures of sufficient size and said strips of gas permeable sealing material being on said front wall to enhance moisture retention within said bag; and, said strips of gas permeable fill being substantially unitary, integral and of uniform porosity to contribute to manufacturing ease of said bag and a reduction in the mount of labor associated with the production thereof.

\* \* \* \* \*